United States Patent [19]
Deering

[11] Patent Number: 5,517,611
[45] Date of Patent: May 14, 1996

[54] FLOATING-POINT PROCESSOR FOR A HIGH PERFORMANCE THREE DIMENSIONAL GRAPHICS ACCELERATOR

[75] Inventor: Michael F. Deering, Los Altos, Calif.

[73] Assignee: Sun microsystems, Inc., Mountain View, Calif.

[21] Appl. No.: 506,003

[22] Filed: Jul. 24, 1995

Related U.S. Application Data

[63] Continuation of Ser. No. 71,709, Jun. 4, 1993, abandoned.

[51] Int. Cl.$^6$ .................................................. G06F 15/16
[52] U.S. Cl. ........................ 395/163; 395/164; 395/375
[58] Field of Search ................................ 395/162–164, 395/138–143, 119–120, 126–127, 133, 821, 825, 375, 775

[56] References Cited

U.S. PATENT DOCUMENTS

| | | | |
|---|---|---|---|
| 4,107,773 | 8/1978 | Gilbreath et al. | 364/200 |
| 4,866,637 | 9/1989 | Gonzalez-Lopez et al. | 395/163 |
| 5,136,664 | 8/1992 | Bersack et al. | 359/163 |
| 5,159,665 | 10/1992 | Priem et al. | 395/143 |
| 5,307,449 | 4/1994 | Kelley et al. | 395/143 |
| 5,317,682 | 5/1994 | Luken, Jr. | 395/163 |

FOREIGN PATENT DOCUMENTS

| | | | |
|---|---|---|---|
| 0410778 | 1/1991 | European Pat. Off. | G06F 15/72 |
| 2186105 | 8/1987 | United Kingdom | G06F 7/48 |
| WO8909447 | 10/1989 | WIPO | G06F 15/00 |

*Primary Examiner*—Raymond J. Bayerl
*Assistant Examiner*—Kee M. Tung
*Attorney, Agent, or Firm*—Blakely Sokoloff Taylor & Zafman

[57] ABSTRACT

A floating-point processor implements specialized graphics micro instructions. The specialized graphics micro instructions include a swap micro instruction which causes a hardware remapping of general purpose register groups to sort triangle vertices. The specialized graphics micro instructions also include specialized conditional branches for three dimensional geometry.

27 Claims, 18 Drawing Sheets

| Instruction Type | 31 28 | 27 21 | 20 | 19 | 18 13 | 12 7 | 6 0 |
|---|---|---|---|---|---|---|---|
| FLOATING POINT AND CLIP_TEST INSTRUCTIONS | MAJOR OP | D BUS (7 BITS) | DS | AS | C BUS (6 BITS) | B BUS (6 BITS) | A BUS (7 BITS) |

| Instruction Type | 31 28 | 27 21 | 20 | 19 | 18 17 | 13 12 | 7 6 | 0 |
|---|---|---|---|---|---|---|---|---|
| FLOAT-TO-FIXED INSTRUCTION | 0111 | D BUS (7 BITS) | D S | A S | MINOR OP (5 BITS) | SHIFT (6 BITS) | A BUS (7 BITS) | |
| INTEGER ALU AND UNARY FLOATING POINT ALU INSTRUCTIONS | 0111 | D BUS (7 BITS) | D S | A S | MINOR OP (5 BITS) | B BUS (6 BITS) | A BUS (7 BITS) | |

| Instruction Type | 31 28 | 27 21 | 20 | 19 18 | 13 12 | 7 6 | 0 |
|---|---|---|---|---|---|---|---|
| FLOATING POINT RECIPROCAL INSTRUCTION | MAJOR OP | D BUS (7 BITS) | D S | C BUS (6 BITS) | B BUS (6 BITS) | A BUS (7 BITS) | |

| Instruction Type | 31 28 | 27 21 | 20 | 19 18 16 | 15 0 |
|---|---|---|---|---|---|
| BRANCH, LOAD MISCELLANEOUS, AND MODIFY STATE BITS INSTRUCTONS | MAJOR OP | D BUS (7 BITS) | D S | MINOR OP | ADDRESS (16 BITS) |
| LOAD IMMEDIATE INSTRUCTION | 1001 | D BUS (7 BITS) | MINOR OP | 011 | IMMEDIATE DATA (16 BITS) |
| MODIFY CONTROL AND MODE BITS INSTRUCTION | MAJOR OP | D BUS (7 BITS) | D S | 11 | ADDRESS (16 BITS) |

| Instruction Type | 31 28 | 27 21 | 20 | 19 18 16 | 15 7 | 6 0 |
|---|---|---|---|---|---|---|
| BLOCK LOAD AND BLOCK STORE INSTRUCTIONS | 1001 | D BUS (7 BITS) | D S | 100 | UNUSED | A BUS (7 BITS) |
| | RS (8 BITS) | | RS (8 BITS) | | OFFSET (16 BITS) | |

*Figure 6*

| MAJOR OP | AS | CLIP_MODE | CONDITION BITS |
|---|---|---|---|
| 0110 | 0 | 0 | ([C BUS] <- - \|[A BUS]\|),(\|[A BUS]\| < [C BUS]) |
| 0110 | 1 | 0 | ([C BUS] <- - \|[M OUT]\|),(\|[M OUT]\| < [C BUS]) |
| 0110 | 0 | 1 | [M OUT]<[C BUS] |
| 0110 | 1 | 1 | [C BUS]<[M OUT] |

| MAJOR OP | AS | MINOR OP | FALU OP | OPERATION |
|---|---|---|---|---|
| 0111 | 0 | 00000 | FLOAT_TO_INT | FLOAT_TO_INT(|A BUS|) |
| 0111 | 1 | 00000 | FLOAT_TO_INT | FLOAT_TO_INT(|M OUT|) |
| 0111 | 0 | 00001 | INT_TO_FLOAT | INT_TO_FLOAT(|A BUS|) |
| 0111 | 1 | 00001 | INT_TO_FLOAT | INT_TO_FLOAT(|M OUT|) |
| 0111 | 0 | 00010 | FABS | FABS(|A BUS|) |
| 0111 | 1 | 00010 | FABS | FABS(|M OUT|) |

| RE-RS | REGISTERS |
|---|---|
| 31-0 | I31-I0 (ILLEGAL IF INPUT BUFFER ISN'T ALLOCATED) |
| 127-32 | P95 THROUGH P0 |
| 191-128 | R63 THROUGH R0 |
| 255-192 | ILLEGAL |

| BRANCH NAME | BRANCH CONDITION |
|---|---|
| GBPX | +X |
| GBMX | -X |
| GBPY | +Y |
| GBMY | -Y |
| GBPZ | +Z |
| GBMZ | -Z |
| GBCTR | CLIP TRIVIAL REJECT |
| GBNTA | NOT TRIVIAL ACCEPT |
| GBNSEC | NOT SINGLE EDGE CLIP |
| GBWFR | WRONG FACE REJECT |
| GBMCE | MODEL CLIP ENABLED |
| GBNCMI | NOT CORRECT MATERIAL INSTALLED |
| GBBFI | BACK FACE INSTALLED |
| GBUBF | BACK FACE AND USE BACK PROPS |
| GBBF | BACK FACE |
| GBCPS | CLIP_PENDING SET |

| BITS | MEANING |
| --- | --- |
| 31-30 | GEOMETRY_MODE |
| 29 | CLIP_MODE |
| 28 | MODEL_CLIPPING_ENABLED |
| 27 | REJECT_FRONT_FACE |
| 26 | REJECT_BACK_FACE |
| 25 | USE_BACK_PROPS |
| 24 | MAT_FACE_INSTALLED |
| 23 | FACE_WE_GOT |
| 22 | CLIP_PENDING |
| 21 | OUTPUT_DST |
| 20-16 | OUTPUT_LEN (FIVE BITS) |
| 15-14 | SWAP_PPP |
| 13 | SWAP_IR |
| 12 | SWAP_PP |
| 11 | SWAP_PO |
| 10-8 | SWAP_RR |
| 7-4 | ICC (N, Z, V, C) |
| 3-2 | FCC (E, L, G, U) |
| 1-0 | DISPATCH_MASK |

*Figure 12a*

| SWAP_RR | Y1>Y3 | Y2>Y3 | Y1<Y2 | SORT ORDER | | |
| --- | --- | --- | --- | --- | --- | --- |
| 000 | 0 | 0 | 0 | 1 | 2 | 3 |
| 001 | 0 | 0 | 1 | 2 | 1 | 3 |
| 010 | 0 | 1 | 0 | 1 | 3 | 2 |
| 011 | 0 | 1 | 1 | CAN NOT HAPPEN | | |
| 100 | 1 | 0 | 0 | CAN NOT HAPPEN | | |
| 101 | 1 | 0 | 1 | 2 | 3 | 1 |
| 110 | 1 | 1 | 0 | 3 | 1 | 2 |
| 111 | 1 | 1 | 1 | 3 | 2 | 1 |

*Figure 12b*

| SWAP_RR | R'8 - R'15 | R'16 - R'23 | R'24 - R'31 |
| --- | --- | --- | --- |
| 000 | R8 - R15 | R16 - R23 | R24 - R31 |
| 001 | R16 - R23 | R8 - R15 | R24 - R31 |
| 010 | R8 - R15 | R24 - R31 | R16 - R23 |
| 011 | - | - | - |
| 100 | - | - | - |
| 101 | R16 - R23 | R24 - R31 | R8 - R15 |
| 110 | R24 - R31 | R8 - R15 | R16 - R23 |
| 111 | R24 - R31 | R16 - R23 | R8 - R15 |

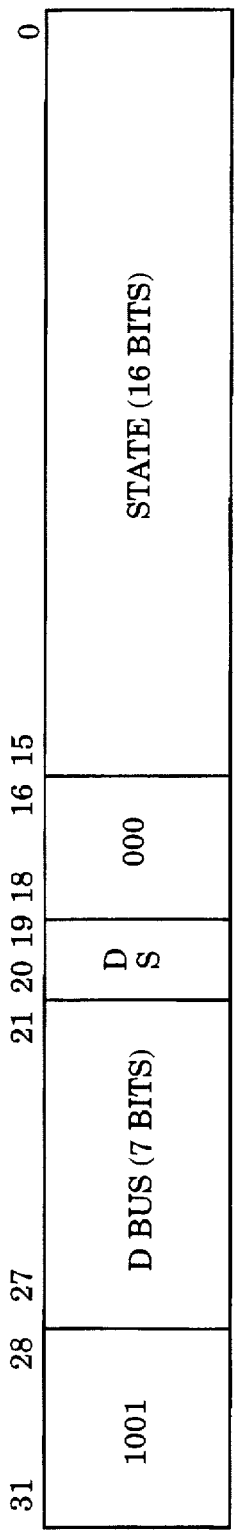

| 31 28 | 27 21 | 20 19 18 | 16 15 0 |
|---|---|---|---|
| 1001 | D BUS (7 BITS) | D S | 000 | STATE (16 BITS) |

*Figure 14a*

| BIT | MEANING |
|---|---|
| 15 | ENABLE LOAD CLIP_PENDING BIT |
| 14 | NEW VALUE OF CHIP_PENDING BIT |
| 13 | ENABLE LOAD FACE REJECTANCE BITS |
| 12 | NEW VALUE OF REJECT_BACK_FACE BITS |
| 11 | NEW VALUE OF REJECT_BACK_FACE BITS |
| 10 | ENABLE LOAD OF USE_BACK_PROPS BIT |
| 9 | NEW VALUE OF USE_BACK_PROPS BIT |
| 8 | ENABLE LOAD OF MAT_FACE_INSTALLED BIT |
| 7 | NEW VALUE OF MAT_FACE_INSTALLED BIT |
| 6 | ENABLE LOAD MODEL_CLIPPING_ENABLED BIT |
| 5 | NEW VALUE OF MODEL_CLIPPING_ENABLED BIT |
| 4 | ENABLE LOAD OUTPUT_dst BIT |
| 3 | NEW VALUE OF OUTPUT_dst BIT |
| 2 | LOAD FACE_WE_GOT BIT (FROM FALU COND) |
| 1-0 | SELECT REGISTER TO TRANSFER TO D BUS |

*Figure 14b*

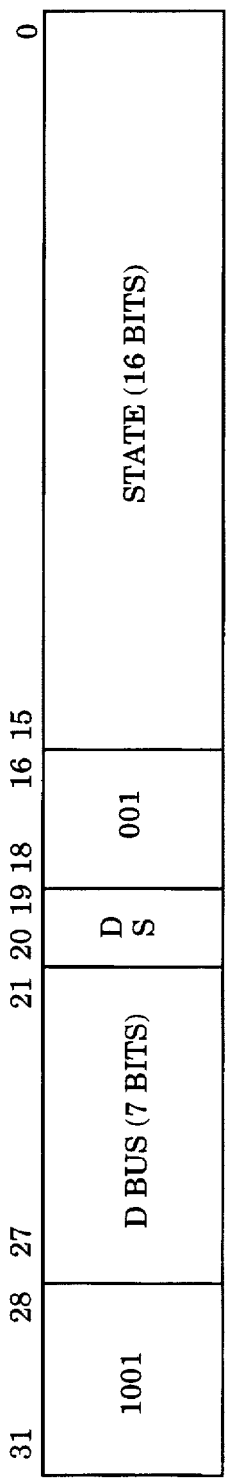

*Figure 15a*

| BIT | MEANING |
|---|---|
| 15 | ENABLE LOAD OF CLIP_BITS REGISTER FROM D BUS |
| 14 | ENABLE LOAD OF STATE_BITS REGISTER FROM D BUS |
| 13 | ENABLE LOAD OUTPUT_LEN FIELD OF STATE_BITS FROM D BUS |
| 12 | ENABLE LOAD OF PC REGISTER FROM D BUS |
| 11 | POP INTERNAL STACK INTO PC (PROGRAM COUNTER) |
| 10 | ENABLE LOAD OF OUTPUT_LEN FIELD OF STATE_BITS FROM FIVE IMMEDIATE BITS |
| 9 | ENABLE LOAD OF DISPATCH_MASK FROM IMMEDIATE BITS |
| 8 | ENABLE LOAD OF GEOMETRY_MODE AND CLIP_MODE FROM IMMEDIATE BITS |
| 7 | ONE BIT CLIP_MODE |
| 6-5 | TWO BIT GEOMETRY_MODE |
| 4-0 | FIVE BITS OF OUTPUT_LEN |
| 1-0 | TWO BIT DISPATCH_MASK |

*Figure 15b*

| BIT | MEANING |
|---|---|
| 16 | ENABLE LOAD OF SWAP_ppp FROM BITS 1 AND 0 |
| 15 | ENABLE LOAD OF SWAP_ir FROM BIT 3 |
| 14 | ENABLE LOAD OF SWAP_pp FROM BIT 0 |
| 13 | ENABLE LOAD OF SWAP_po FROM BIT 2 |
| 12 | LOAD SWAP_rr BITS FROM FALU |
| 11 | LOAD SWAP_rr BITS FROM BITS 2 THROUGH 0 |
| 10 | NEED I (IF NOT CLIP_PENDING) |
| 9 | FREE I |
| 8 | NEED O |
| 7 | FREE O |
| 6 | DISPATCH OFF NEW I (IF NOT CLIP_PENDING) |
| 5 | LAST OUTPUT OF COMMAND (IF NOT CLIP_PENDING) |
| 4 | NULL OUTPUT |
| 3-0 | IMMEDIATE CONSTANT BITS |

FLOATING-POINT PROCESSOR FOR A HIGH PERFORMANCE THREE DIMENSIONAL GRAPHICS ACCELERATOR

This is a continuation of application Ser. No. 08/071,709 filed Jun. 4, 1993, now abandoned.

BACKGROUND OF THE INVENTION

1. Field of the Invention

This invention relates to the field of computer graphics systems. More particularly, this invention relates to a floating-point processor for a high performance three dimensional graphics accelerator in a computer system.

2. Art Background

A three dimensional graphics accelerator is a specialized graphics rendering subsystem for a computer system. Typically, an application program executing on a host processor of the computer system generates three dimensional geometry input data that defines three dimensional graphics elements for display on a display device. The application program transfers the geometry input data from the host processor to the graphics accelerator. Thereafter, the graphics accelerator renders the corresponding graphics elements on the display device.

In prior graphics accelerators, the three dimensional graphics functions of transformation, clip test, face determination, lighting, clipping, and screen space conversion are often performed by commercially available digital signal processing (DSP) chips. However, such DSP chips are not optimized for three dimensional computer graphics.

For example, the fast access internal registers provided in a typical DSP chip are too few in number to accommodate the inner loops of most three dimensional graphics processing algorithms. As a consequence, on-chip data caches are employed to compensate for the limited number of internal registers. Moreover, DSP chips require an assortment of support chips to function in a multiprocessing environment. Unfortunately, the addition of the support chips increases printed circuit board area for the graphics accelerator, increases system power consumption, increases heat generation, and increases system cost.

As another example, three dimensional graphics functions often require sorting of three dimensional vertices according some criteria. A graphics accelerator employing DSP chips performs such sorting by physically transferring vertex data between internal registers or data cache locations. Unfortunately, the physical transfer of the vertex data is time consuming and causes a decrease in system performance.

As a further example, the DSP chip in prior systems typically must perform input/output tasks for accessing geometry input parameters and delivering transformed results. The DSP chip performs the input/output tasks in addition to the graphics function tasks. Unfortunately, the time spent by the DSP chip on the parameter input/output tasks is taken away from the graphics function tasks, thereby decreasing graphics processing performance.

As will be described, the present invention is a floating-point processor for a high performance three dimensional graphics accelerator in a computer system that provides specialized graphics micro instructions and hardware features for improving graphics accelerator performance while minimizing graphics accelerator costs.

SUMMARY OF THE INVENTION

A floating-point processor for a high performance three dimensional graphics accelerator in a computer system is disclosed. The floating-point processor comprises an input circuit, an output circuit, a register file circuit, a control circuit, a set of functional units, and a control store interface circuit.

The input circuit implements a double buffer input register file. The input circuit receives reformatted geometry packets over a command to floating-point bus from a command preprocessor, and buffers the reformatted geometry packet. The output circuit implements a double buffer output register file. The output circuit buffers draw packets, and broadcasts the draw packets over a command to draw bus to a set of draw processors. The register file circuit contains a general purpose register file including a first register group, a second register group and a third register group.

The control sequencer assembles the draw packets into the output register file by reading a plurality of specialized graphics micro instructions from a control store, and executing the specialized graphics micro instructions using a set of function units. The specialized graphics micro instructions comprise a floating-point compare micro instruction and a swap micro instruction. The swap micro instruction causes the register file circuit to rearrange a register map for the first, second, and third register groups according to a series of result flags corresponding to the floating-point compare micro instruction, such that a set of vertex values stored in the first, second, and third register groups are sorted in a predefined order.

The function units comprise a floating-point multiplier circuit, a floating point arithmetic logic unit circuit, a reciprocal circuit, and an integer arithmetic logic unit circuit, a reciprocal circuit, and a reciprocal square-root circuit. The general purpose register file comprises a predetermined number of general purpose registers, such that the predetermined number of general purpose registers provides data storage for the inner loops of three dimensional graphics processing algorithms.

The specialized graphics micro instructions further comprise a clip test micro instruction. The clip test micro instruction compares a point to one or two clip planes according to a clip-mode bit of a state-bits register, and shifts one or two result bits into a clip bits register. The specialized graphics micro instructions further comprise a plurality of geometry conditional branch instructions. Each geometry conditional branch instruction determines a branch condition according to the contents of the clip bits register.

The specialized graphics micro instructions further comprise a micro instruction for converting a floating-point value to an integer value, a micro instruction for converting the integer value to the floating-point value, and a micro instruction for determining an absolute value of a data value. The specialized graphics micro instructions further comprise a floating-point reciprocal micro instruction, a reciprocal square-root micro-instruction, a saturating add (0,1) micro instruction, and a block load instruction and a block store instruction for performing data block transfers between the control store and the general purpose register file.

BRIEF DESCRIPTION OF THE DRAWINGS

FIG. 6 illustrates the microcode instruction formats for the floating point processor one embodiment.

FIG. 12a illustrates the state bits register which contains an assortment of special condition bits.

FIG. 12b illustrates the vertex compare sort results stored in the swap_rr field of the state bits register for all possible y coordinate orderings.

FIG. 12c illustrates the remapping of the group 1–3 R registers corresponding to the contents of the swap_rr field.

FIGS. 13a–13d illustrate the organization of the clip bits register and the motion of a shift operation that occurs when the clip_test instruction is executed.

FIGS. 14–14b illustrate the modify state bits micro instruction, which updates selected bits in state_bits register.

FIGS. 15–15b illustrate the load miscellaneous registers micro instruction, which loads the non register file registers from dynamic results.

FIGS. 16–16b illustrate the modify control and mode bits micro instruction, which updates selected bits in the state_bits register, and causes initiation of certain control actions.

DETAILED DESCRIPTION OF THE INVENTION

A high performance three dimensional graphics accelerator in a computer system is disclosed. In the following description for purposes of explanation specific applications, numbers, apparatus, configurations and circuits are set forth in order to provide a thorough understanding of the present invention. However, it will be apparent to one skilled in the art that the present invention may be practiced without these specific details. In other instances well known systems are shown in diagrammatical or block diagram form in order not to obscure the present invention unnecessarily.

Figure 1:
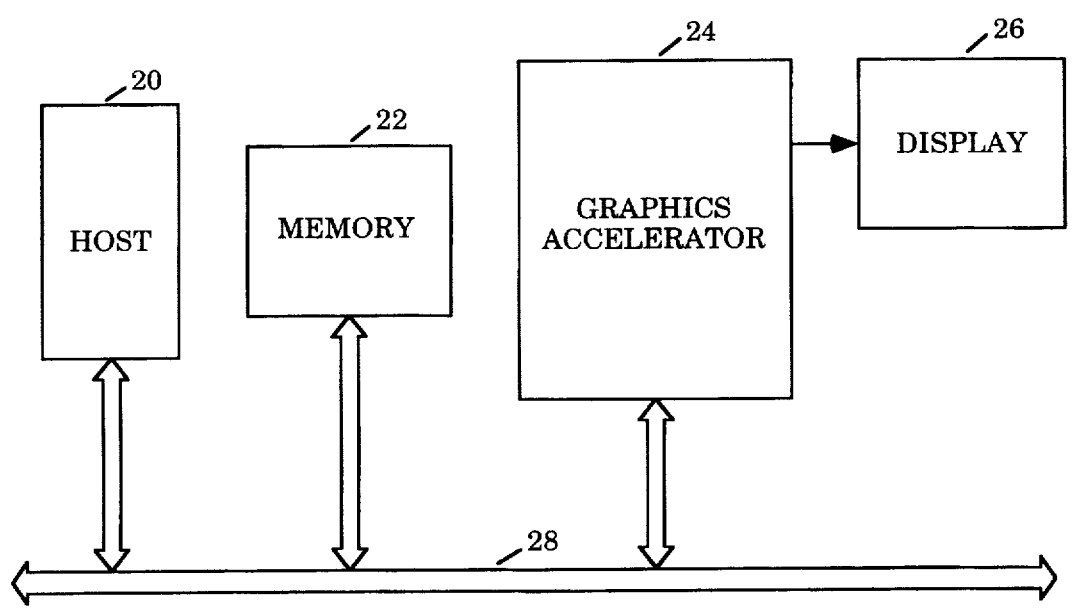
FIG. 1 is a block diagram of a computer system including a host processor, a memory subsystem, a graphics accelerator, and a display device.

Referring now to FIG. 1, a block diagram of a computer system is shown, including a host processor 20, a memory subsystem 22, a graphics accelerator 24, and a display device 26. The host processor 20, the memory subsystem 22, and the graphics accelerator 24 are each coupled for communication over a host bus 28.

The display device 26 represents a wide variety of raster display monitors. The host processor 20 represents a wide variety of computer processors and CPUs, and the memory subsystem 22 represents a wide variety of memory subsystems including random access memories and mass storage devices. The host bus 28 represents a wide variety of communication or host computer busses for communication between host processors, CPUs, and memory subsystems, as well as specialized subsystems.

The host processor 20 transfers information to and from the graphics accelerator 24 according to a programmed input/output (I/O) protocol over the host bus 28. Also, the graphics accelerator 24 accesses the memory subsystem 22 according to a direct memory access (DMA) protocol.

A graphics application program executing on the host processor 20 generates geometry data arrays containing three dimensional geometry information that define an image for display on the display device 26. The host processor 20 transfers the geometry data arrays to the memory subsystem 22. Thereafter, the graphics accelerator 24 reads in geometry data arrays using DMA access cycles over the host bus 28. Alternatively, the host processor 20 transfers the geometry data arrays to the graphics accelerator 24 with programmed I/O over the host bus 28.

The three dimensional geometry information in the geometry data arrays comprises a stream of input vertex packets containing vertex coordinates (vertices), and other information that defines triangles, vectors and points in a three dimensional space. Each input vertex packet may contain any combination of three dimensional vertex information, including vertex normal, vertex color, facet normal, facet color, texture map coordinates, pick-id's, headers and other information.

A headerless input vertex packet may define a triangle strip in the form of a "zig zag" pattern of adjacent triangles. A headerless input vertex packet may also define a triangle strip in the form of a "star strip" pattern of triangles. In addition, a headerless input vertex packet may define an isolated triangle. An input vertex packet having a header may change triangle strip formats for each triangle and change between "zig zag" format, "star" format, and isolated triangles.

Figure 2:
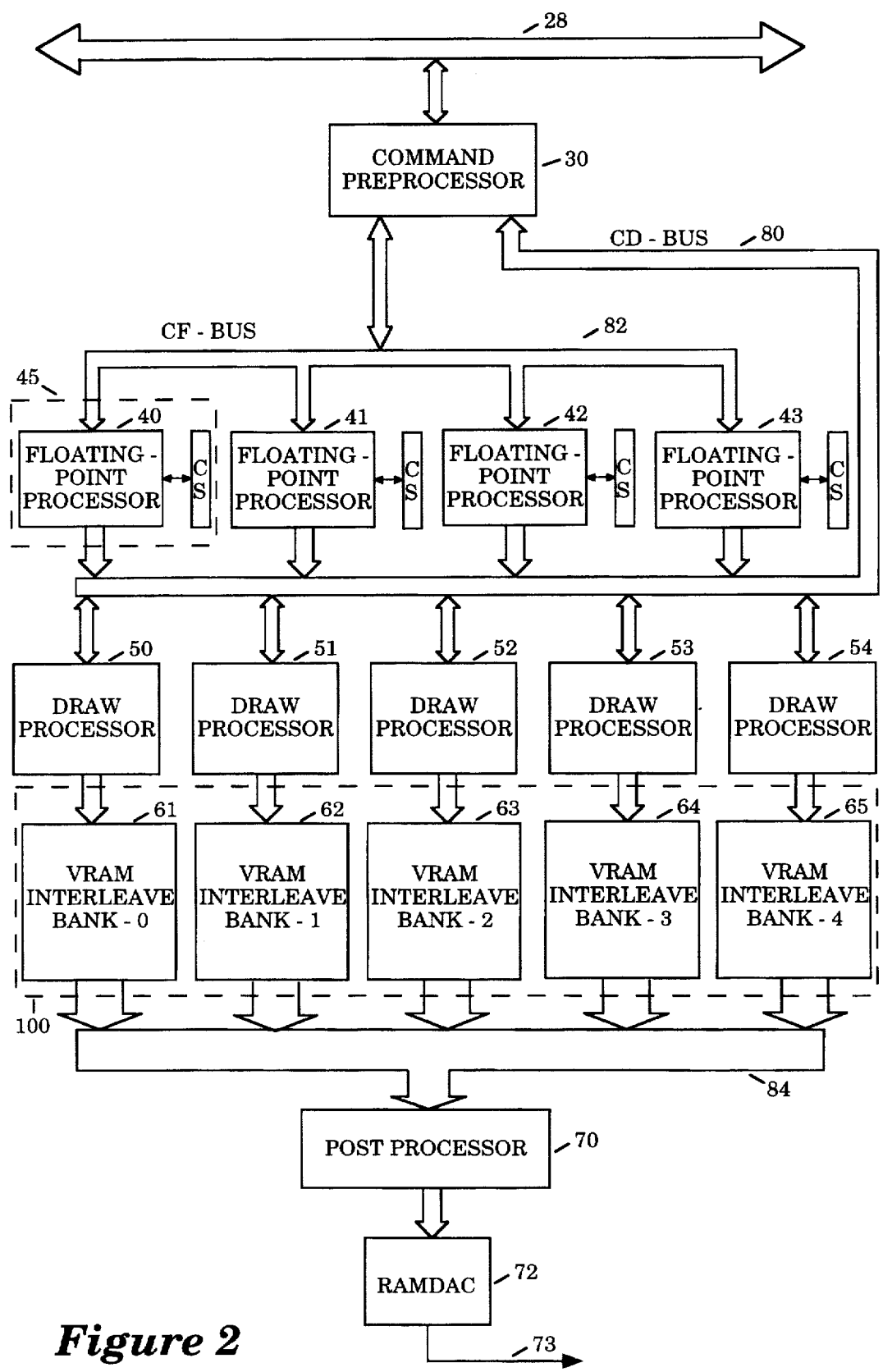
FIG. 2 is a block diagram of the graphics accelerator, which is comprised of a command preprocessor, a set of floating-point processors, a set of draw processors, a frame buffer, a post-processor, and a random access memory digital-to-analog converter (RAMDAC).

FIG. 2 is a block diagram of the graphics accelerator 24. The graphics accelerator 24 is comprised of a command preprocessor 30, a set of floating-point processors 40–43, a set of draw processors 50–54, a frame buffer 100, a post-processor 70 and a random access memory/digital-to-analog converter (RAMDAC) 72. The RAMDAC 72 is similar to commercially available RAMDACs that implement look-up table functions. For one embodiment, the command preprocessor 30, the floating-point processors 40–43, the draw processors 50–54, and the post-processor 70 are each individual integrated circuit chips.

The command preprocessor 30 is coupled for communication over the host bus 28. The command preprocessor 30 performs DMA reads of the geometry data arrays from the memory subsystem 22 over the host bus 28. The host processor 20 transfers virtual memory pointers to the command preprocessor 30. The virtual memory pointers point to the geometry data arrays in the memory subsystem 22. The command preprocessor 30 converts the virtual memory pointers to physical memory addresses for performing the DMA reads to the memory subsystem 22 without intervention from the host processor 20.

The command preprocessor 30 receives a stream of input vertex packets from the geometry data arrays, and reorders the information contained within the input vertex packets. The command preprocessor 30 reorders the information from each input vertex packet into reformatted vertex packets having a standardized element order.

The command preprocessor 30 converts the information in each input vertex packet from differing number formats into the 32 bit IEEE floating-point number format. The command preprocessor 30 converts 8 bit fixed-point numbers, 16 bit fixed-point numbers, and 32 bit or 64 bit IEEE floating-point numbers.

The command preprocessor 30 reformats header fields, inserts constants, and generates sequential pick-id's. The command preprocessor 30 examines the chaining bits of the header and reassembles the information from the input vertex packets into the reformatted vertex packets containing completely isolated geometry primitives including points, lines and triangles.

The command preprocessor 30 transfers the reformatted-vertex packets over a command-to-floating-point bus (CF-BUS) 82 to one of the floating-point processors 40–43. The command preprocessor 30 receives control and status signals from the floating-point processors 40–43 over a control portion of the CF_BUS 82. The control and status signals indicate the availability of input buffers within the floating-point processors 40–43 for receiving the reformatted vertex packets. The command preprocessor 30 may also bypass the floating-point processors 40–43 and transfer direct port packets over a command-to-draw bus (CD-BUS) 80 to the draw processors 50–54.

The floating-point processors 40–43 are each substantially similar. Each floating-point processor 40–43 implements a 32 bit micro-code driven floating-point core, along with parallel input and output packet communication hardware. Each of the floating-point processors 40–43 implements floating-point functions including multiply, ALU, reciprocal, reciprocal square-root and integer operations. Each floating-point processor 40–43 implements a wide assortment of specialized graphics instructions and features. Each floating-point processor 40–43 is optimized to implement the number of fast internal registers required to perform the largest common three dimensional graphics processing micro-code inner loop implemented by the graphics accelerator 24.

For one embodiment, each floating-point processor 40–43 is implemented on a single integrated circuit chip. The only support chips required for each floating-point processor 40–43 is a set of four external SRAM chips that provide an external micro-code in a control store (CS).

Each floating-point processor 40–43 implements a function for setting up triangles for scan conversion by the draw processors 50–54. The setup function includes the step of sorting the three vertices of a triangle in ascending y order. Each floating-point processors 40–43 broadcasts draw packets to all of the draw processors 50–54 over the CD-BUS 80. The draw packets comprises final geometry primitives, including triangles, points and lines.

The draw processors 50–54 function as VRAM control chips for the frame buffer 100. The draw processors 50–54 concurrently render an image into the frame buffer 100 according to an draw packet received from one of the floating-point processors 40–43 or according to a direct port packet received from the command preprocessor 30.

Each draw processor 50–54 performs the scan conversion functions of edgewalking function and scan interpolation. The replication of the edgewalking and scan interpolation functions among the draw processors 50–54 obviates the need for large scale communication pathways between separate edgewalking and scan interpolation processors, thereby minimizing the pin counts of each of the draw processors 50–54 and decreasing printed circuit board space requirements.

The frame buffer 100 is arranged as a set of 5 VRAM interleave banks. The draw processor 50 writes pixel data into an interleave bank_0 61, the draw processor 51 writes pixel data into an interleave bank_1 62, the draw processor 52 writes pixel data into an interleave bank_2 63, the draw processor 53 writes pixel data into an interleave bank_3 64, the draw processor 54 writes pixel data into an interleave bank_4 65.

Each draw processor 50–54 renders only the pixels visible within the corresponding interleave bank 61–65. The draw processors 50–54 concurrently render the triangle primitive defined by a draw packet to produce the correct combined rasterized image in the frame buffer 100. Each draw processor 50–54 rasterizes every fifth pixel along each scan line of the final rasterized image. Each draw processor 50–54 starts a scan line biased by 0, 1, 2, 3, or 4 pixel spaces to the right.

Each draw processor 50–54 optionally performs depth cueing. Each pixel of a triangle, vector or dot rendered may be depth cued within the draw processors 50–54 without the performance penalty of prior graphics systems that perform depth cueing in floating-point processors. Each draw processor 50–54 optionally performs rectangular window clipping, blending and other pixel processing functions.

The post-processor 70 receives interleaved pixel data from the frame buffer 100 over the video bus 84. The post-processor 70 performs rectangular window clipping, blending and other pixel post processing functions, as well as color look-up table and cursor functions. The RAMDAC 72 converts the pixel data received from the post-processor 70 into video signals 73 for the display device 26.

Figure 3:
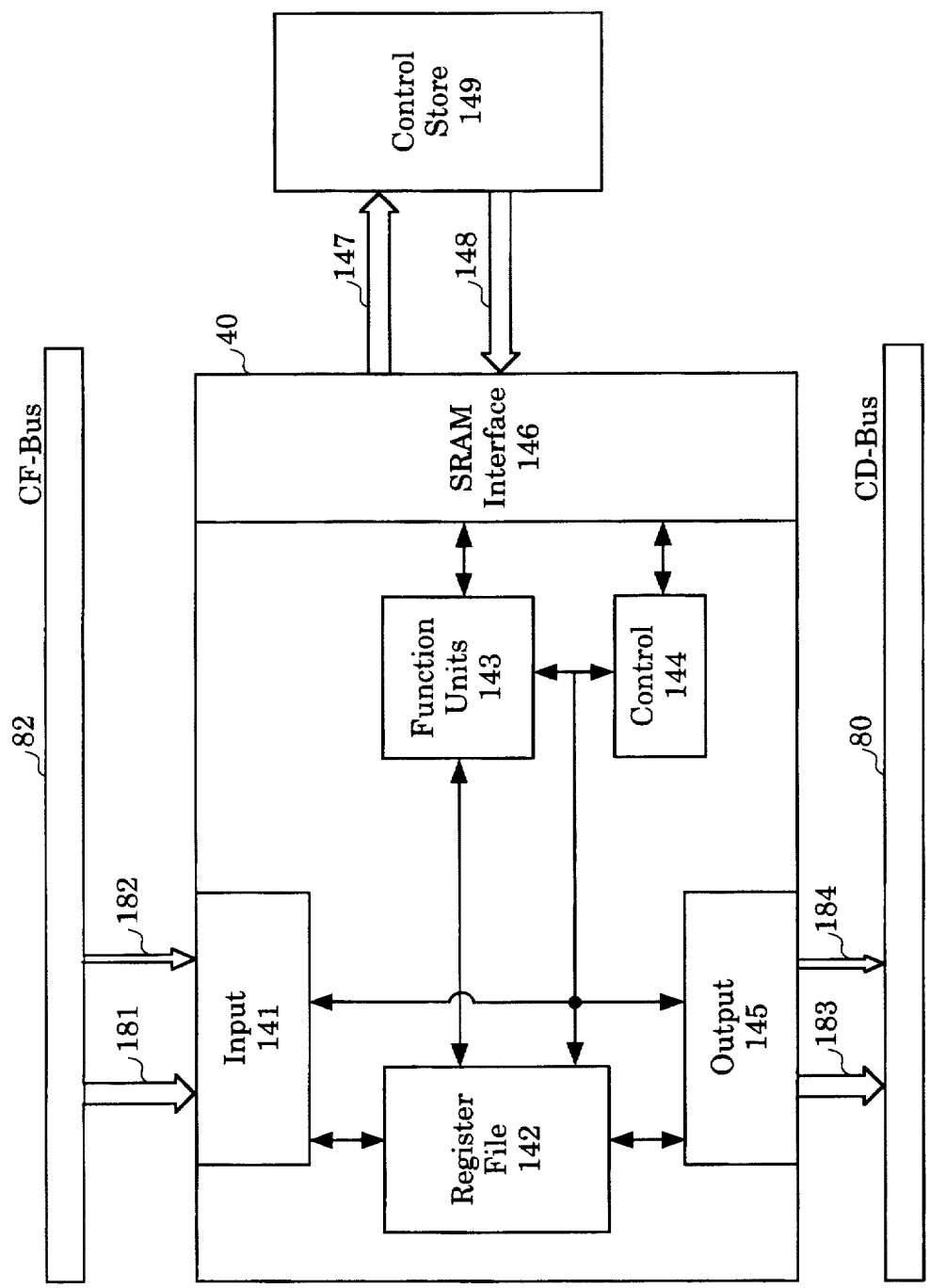
FIG. 3 is a block diagram of a floating-point processor section, including a control store (CS), an input circuit, an output circuit, a register file, a set of functional units, a control circuit, and an SRAM interface circuit.

FIG. 3 is a block diagram of the floating-point processor section 45, which includes the floating-point processor 40 and a control store (CS) 149. The floating-point processor 40 is comprised of an input circuit 141, an output circuit 145, a register file 142, a set of functional units 143, a control circuit 144, and a SRAM interface circuit 146.

The floating-point processor 40 receives the reformatted vertex packets over a data portion 181 of the CF-BUS 82. The command preprocessor 30 transfers control signals over a control portion 182 of the CF-BUS 82 to enable and disable the input buffer 141.

The output circuit 145 transfers draw packets over a data portion 183 of the CD-BUS 80. The output circuit 145 also transfers control signals over a control portion 184 of the CD-BUS 80 to synchronize data transfer to the draw processors 50–54 and to coordinate bus activity on the CD-BUS 80 with the command preprocessor 30.

The input circuit 141 contains a set of registers arranged as a pair of 32 register files in a double buffered fashion. Similarly, the output circuit 145 contains a set of registers arranged as a pair of 32 register double buffered register files.

For one embodiment, the register file 142 is a multiport register file comprised of one hundred and sixty 32 bit registers. The register file 142 provides enough high speed on-chip data storage for the constants, parameters, and working variables required for the common inner loop for processing of dot, vector, and triangle commands.

The SRAM interface 146 communicates with a control store (CS) 149 over a control store address bus 147 in a control store data bus 148. For one embodiment the control store address bus 147 is 17 bits wide and the control store data bus 148 is 32 bits wide. The control store 149 is comprised of four 128k by eight bit SRAMs. The floating point processor 40 accesses the microcode in the CS 149 through the SRAM interface circuit 146 without requiring extra glue logic.

The control circuit 144 implements a control sequencer for fetching and executing micro-code instructions from the CS 149. The control sequencer is decoupled from transfers into the input circuit 141 and transfers out of the output circuit 145. The registers in the input circuit 141 and the output circuit 145 are arranged as automatically sequenced FIFOs.

The micro-code executing on the floating-point processor 40 accesses the registers of the input circuit 141 and the output circuit 145 as special register files. The instruction set for the floating-point processors 40 includes commands for requesting and for relinquishing the register files, as well as commands for queuing the transmission completed data packets over the CD-BUS 80.

The function units 143 implement a parallel floating-point multiplier, a parallel floating-point ALU, a parallel floating-point iterative reciprocal circuit, a reciprocal square-root circuitry, and a parallel integer ALU. The floating point processors 40 implements 32-bit internal floating point operations. The floating-point processor 40 has an internal subroutine stack.

The floating-point processors 40 implements the triangle setup function for scan conversion by the draw processors 50–54. The first stage of the triangle setup function sorts the three vertices of a triangle in ascending y order. The floating-point processor 40 implements a special instruction that reorders a section of a register file 142 in hardware based upon the results of the last three comparisons of the y coordinates of the vertices.

A clip testing function implemented in the floating-point processors 40 computes a vector of clip condition bits. The floating-point processor 40–43 implements a special clip test instruction that computes pairs of the clip condition bits, while shifting the clip condition bits into a special clip register. After the clip condition bits have been computed, special branch instructions decode the clip condition bits contained in the clip register into the appropriate clip condition. The floating-point processor 40 implements separate branch instructions for clipping triangles and vectors. The special branch instructions enable testing of multiple clip conditions within the same instruction.

The floating point processors 40 implements floating-point to fixed-point and fixed-point to floating-point conversion instructions, integer bit-field extraction and insertion instructions, and barrel shift and merge instructions. The floating point processors 40 implements block load/store instructions for transfers to the CS 149, as well as integer functions.

Figure 4:
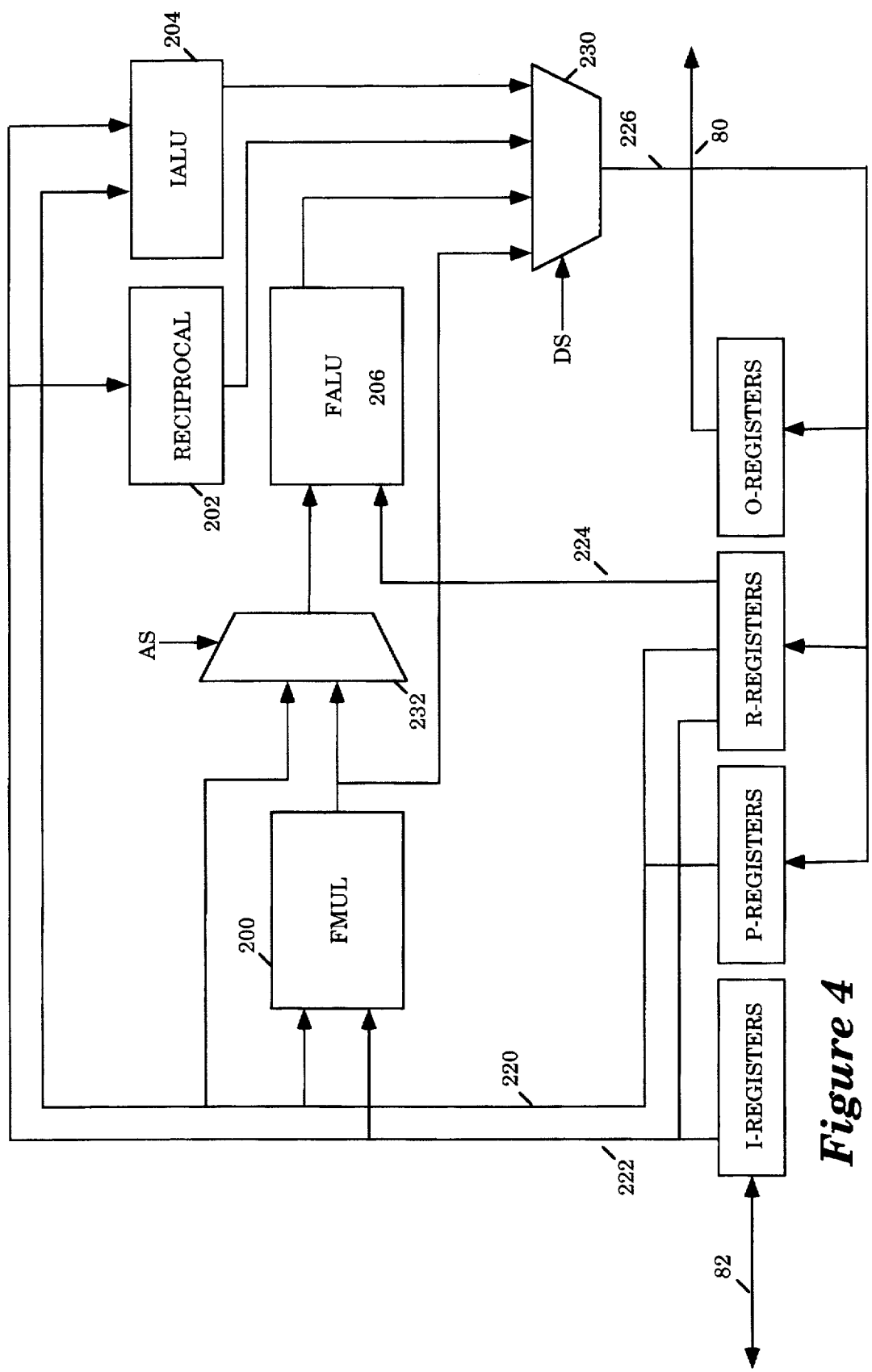
FIG. 4 illustrates the functional units and the data paths for the floating-point processor, wherein the data paths comprise three source buses (an A bus, a B bus, and a C bus) and one destination bus (a D bus).

FIG. 4 illustrates the functional units and the data paths for the floating-point processor 40. The data paths comprise three source buses (an A bus 220, a B bus 222, and a C bus 224) and one destination bus (a D bus 226). The functional unit comprises a floating point multiplier (FMUL) 200, an integer arithmetic logic unit (IALU) 204, a floating-point arithmetic logic unit (FALU) 206, and a reciprocal circuit 202. Also shown is the logical arrangement of the internal registers in the input circuit 141 and the output circuit 145 and the register file 142. The internal registers are arranged into four register groups: I registers, O registers, R registers, and P registers.

Figure 5:
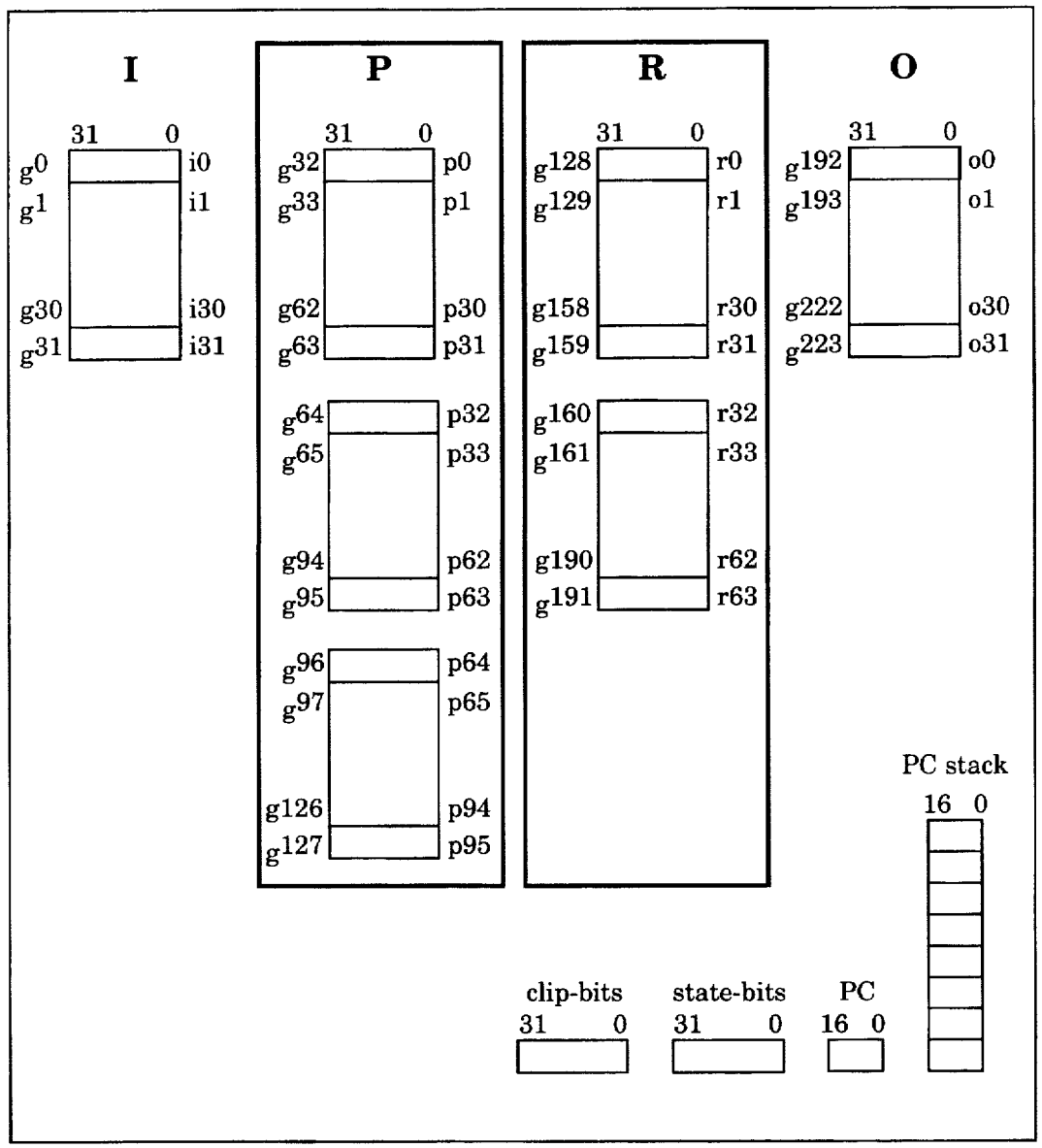
FIG. 5 illustrates the register mapping of the I registers of the input circuit, the O registers of the output circuit, and the R registers and the P registers of the register file.

FIG. 5 illustrates the register mapping of the I registers, the O registers, the R registers, and the P registers. The I registers correspond to the 64 registers in the input circuit 141, and are arranged as a pair of doubled buffered 32 entry register files. The O registers correspond to the 64 registers in the output circuit 145, and are arranged as a pair of doubled buffered 32 entry register files. The R and P registers are contained in the register file 142, and are single buffered. There are 64 R registers and 96 P registers.

The I registers hold input parameters for a reformatted vertex packet received over the CF_BUS 82. At any one time, one bank of the I registers are available for access by the micro-code, while the remaining bank of the I registers are used as an input FIFO for a next reformatted vertex packet transferred over the CF_BUS 82. The available I registers are referenced as registers I0 to I31.

When accessing a next I register bank, the control sequencer waits if a next reformatted vertex packet is not fully assembled in the alternate I register bank. The control sequencer can release an I register bank after the corresponding reformatted vertex packet has been accessed, even before the corresponding command processing is complete.

The command operational code of a reformatted vertex packet is contained in the least significant five to nine bits of I0. The floating-point processor 40 implements a special command decode instruction that automatically dispatches to a micro-code jump table based upon the least significant five to nine bits of I0.

The O registers hold the draw packets for transfer over the CD_BUS 80. At any one time, one bank of the O registers are available for access by the micro-code, while the remaining bank of the O registers are used as an output buffer for a next draw packet. The available O registers are referenced as registers O0 to O31.

A bank of the O registers hold draw packets having up to 32 parameters. The output circuit 145 transfers the draw packets from the O registers over the FD_BUS 80. When accessing a next O register bank, the control sequencer waits until the previous draw packet has drained from the alternate O register bank. The control sequencer can request an O register bank in the middle of processing a reformatted geometry packet to allow extra time for the output circuit 145 to drain the O register bank.

The R registers are general purpose registers. The P registers are used for floating-point multiplication constants such as viewing matrices, screen coordinate conversions, etc. The second and third groups of the P registers are used as general temporaries, as well as additional multiplication constants.

The clip_bits register is a 32 bit clip status register. The clip_bits register contains condition codes corresponding to the clip status of a triangle, vector or dot. The contents of the clip_bits register are updated one or two bits at a time by the clip-test instruction. The contents of the clip_bits register are tested by an assortment of specialized branch instructions.

The state_bits register is a 32 bit condition code and status register. The state_bits register contains an assortment of specialized flags and state bits. The contents of the state_bits register are affected by a number of instructions, and are explicitly set by a pair of state update instructions.

The PC register is the 16 bit program counter. The PC stack is a hardware stack of eight 16 bit program counters for subroutine call/return.

FIG. 6 illustrates the microcode instruction formats for the floating point processor 40 for one embodiment. The microcode instruction is 32 bits wide, and is divided into five general field types: op-code field, control field, a register destination D for multiply/add field, a register source C for add field, a register source B for multiply field, and a register source A for multiply field.

The A bus 220 provides an input path to the FMUL 200, an input to the IALU 204, and a multiplexed input path to the FALU 206. The A-bus field of a micro-instruction specifies the source for data transferred over the A bus 220. The A-bus field indicates R registers R0 through R63, and P registers P0 through The B bus 222 is another input path to the FMUL 200, the only input path to a reciprocal circuit 202, and another input path to the IALU 204. The B-bus field of a micro-instruction specifies the source for data transferred over the B bus 202. The B-bus field indicates R registers R0 through R63 or R registers R0 through R31, and I registers I0 through I31, as specified by mode bits set within the state bits register.

The C bus 224 is another input path to the FALU 206. The C-bus field of a micro-instruction specifies the source for data transferred over the C bus 224. The C-bus field indicates R registers R0 through R63, independent of any mode specified by the state bits register.

The D bus 226 is the output data path from the functional units of the floating-point processor 40. The D bus 226 carries the outputs from either the FMUL 200, the FALU 206, or in some instructions, the IALU 204 or the reciprocal circuit 202 according to the DS field of the micro instruction. The D-bus field of a micro-instruction specifies the destination for data transferred over the D bus 226. The D-bus field indicates R registers R0 through R63, O registers O0 through O31, or P registers P0 through P31 or P registers P32 through P63, as specified by mode bits set within the state_bits register.

The AS field of a micro instruction determines the source data for one input to the FALU 206. The AS field selects either the data transferred over the A bus 220 or the B bus 222. The AS field provides the selection control for a multiplexer 232.

The DS field of a micro instruction determines the source for data transferred over the D bus 226. The DS field selects either the output of the FMUL 200, the output of the FALU 206, the output of the IALU 204, or the output of the reciprocal circuit 202. The DS field provides the selection control for a multiplexer 230.

The minor op field of a micro instruction specifies a particular instruction within a specific instruction group. The size and position of the minor op field varies with the instruction group.

Figures 7A, 7B:
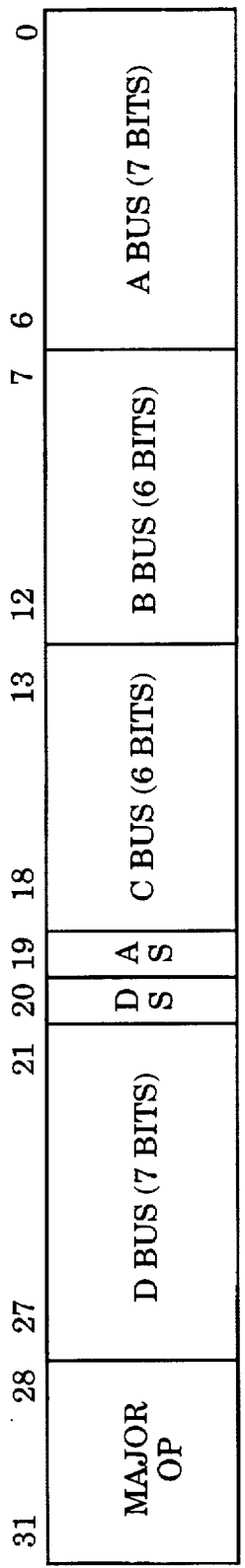
FIGS. 7a–7b illustrate the format of a clip_test micro instruction which compares a point to one or two clip planes, and shifts one or two result bits from the comparison into the clip_bits register.

FIGS. 7a–7b illustrate the format of a clip_test micro instruction implemented in the floating-point processor 40. The clip_test micro instruction compares a point to one or two clip planes, and shifts one or two result bits from the comparison into the clip_bits register. A clip_mode bit in the state_bits register determines whether to compare the point against one or two clip planes.

If clip_mode bit in the state_bits register is zero, the contents of the clip_bits register are shifted left two bits, and the two condition bits shown in FIG. 7b are copied into bit positions one and zero. If clip_ is one, the contents of the clip_bits register are shifted left by one bit, and the condition bit shown in FIG. 7b is copied into bit position zero. The FALU 206 condition code bits for clip_test represent the comparison of fabs([a bus]) or fabs ([m out]) with fabs ([c bus]), where fabs is the floating-point absolute value, and where m out is the output of the multiplexer 232.

Figures 8A, 8B:
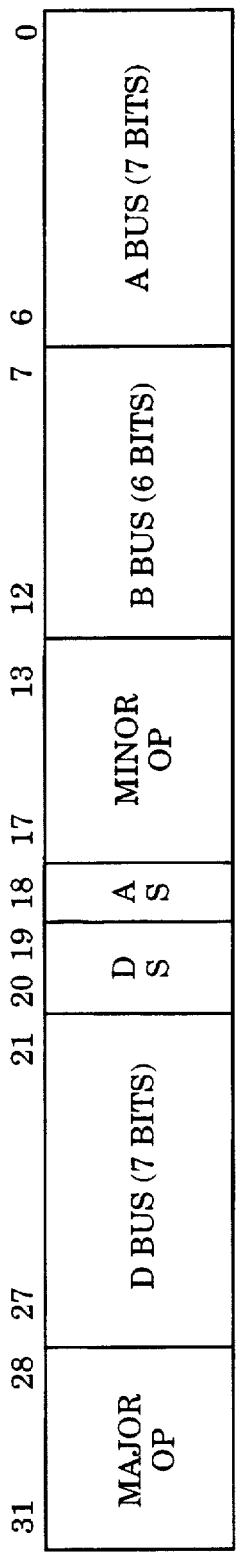
FIGS. 8a–8b illustrate the format of unary FALU micro instructions implemented in the floating-point processor.

FIGS. 8a–8b illustrate the format of unary FALU micro instructions implemented in the floating-point processor 40. The FALU condition code bits for fabs represent the comparison of [a-bus] or [m-out] with zero.

Figure 9:
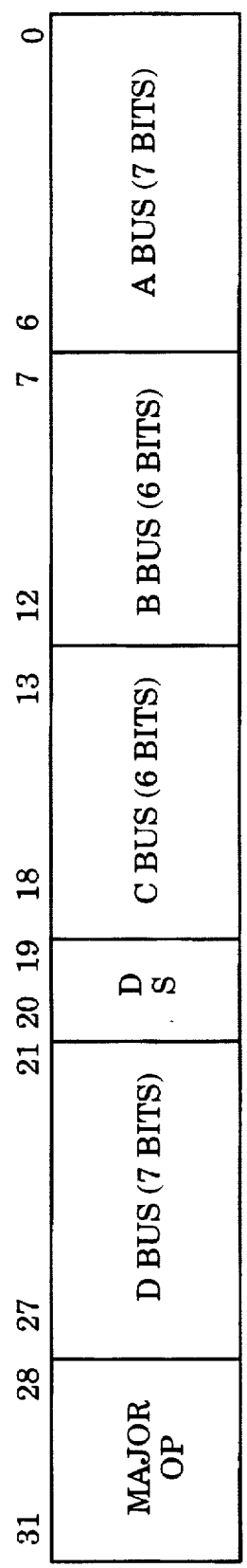
FIG. 9 illustrates the format of floating-point reciprocal micro instructions which perform a floating-point reciprocal operation on the contents of the B bus.

FIG. 9 illustrates the format of floating-point reciprocal micro instructions implemented in the floating-point processor 40. The reciprocal micro instructions perform a floating-point reciprocal operation on the contents of the B bus 222. The result of the reciprocal operation is available nine cycles later and is valid until a replaced by a subsequent reciprocal result. A subsequent reciprocal operation may be started every eight cycles without replacing the results of the previous reciprocal instruction.

Figure 10A:
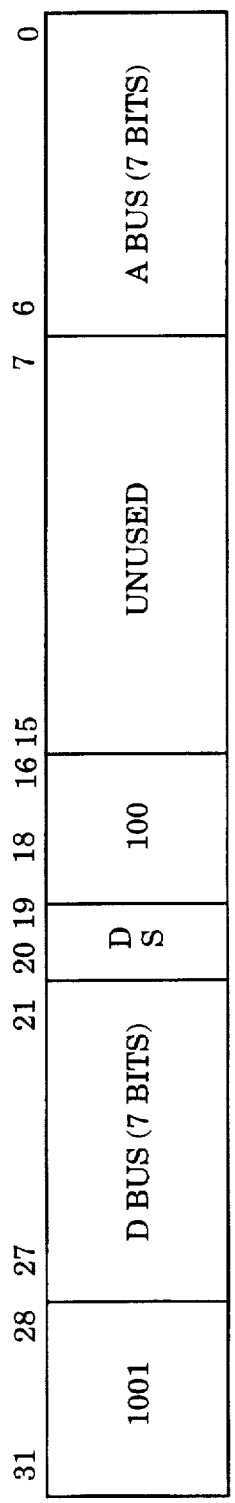
FIGS. 10a–10b illustrate the format of block load micro instructions and the mapping of the RS and RE values of the block load micro instruction to the P registers bc R registers, and the O registers.

FIG. 10a illustrates the format of block load micro instructions implemented in the floating-point processor 40. The block load micro instructions specify block load operations into the P registers, the R registers, and the O registers from the CS 49. The block load micro instruction can block load from 1 to 192 registers in one operation.

Figure 10B:
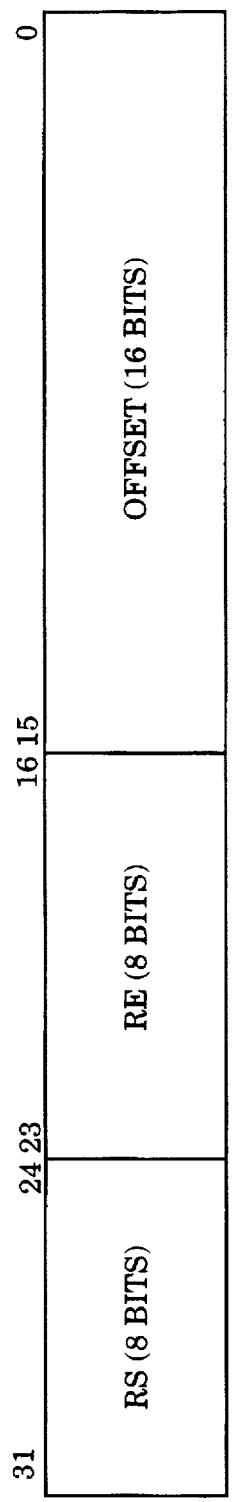

The block load micro instruction specifies a block load from the CS 49 location (R[ra]+offset) to registers R[rs]–R[re]. FIG. 10b illustrates the mapping of the. RS and RE values of the block load micro instruction to the P registers, the R registers, and the O registers of the floating point processor 40.

Figure 10C:
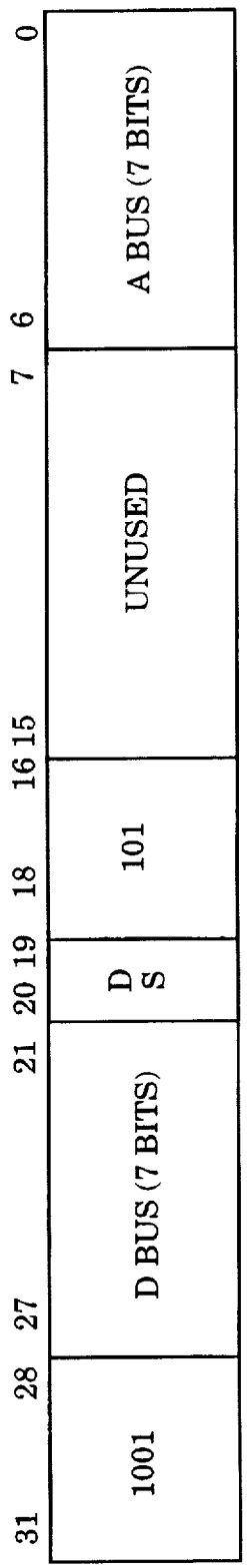
FIGS. 10c–10d illustrate the format of block store micro instructions and the mapping of the RS and RE values of the block store micro instruction to the P registers, the R registers, and the O registers.

FIG. 10c illustrates the format of block store micro instructions implemented in the floating-point processor 40. The block store micro instructions specify block store operations from the P registers, the R registers, and the O registers to the CS 49. The block store micro instruction can block store from 1 to 192 registers in one operation.

Figure 10D:
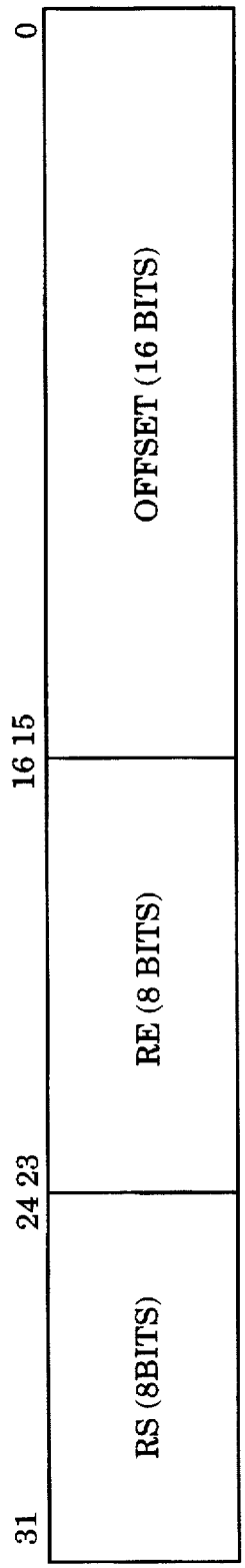

The block store micro instruction specifies a block store from registers R[rs]–R[re] to the CS 49 location (R[ra]+offset). FIG. 10d illustrates the mapping of the RS and RE values of the block store micro instruction to the P registers, the R registers, and the O registers of the floating point processor 40.

Figures 11A, 11B:
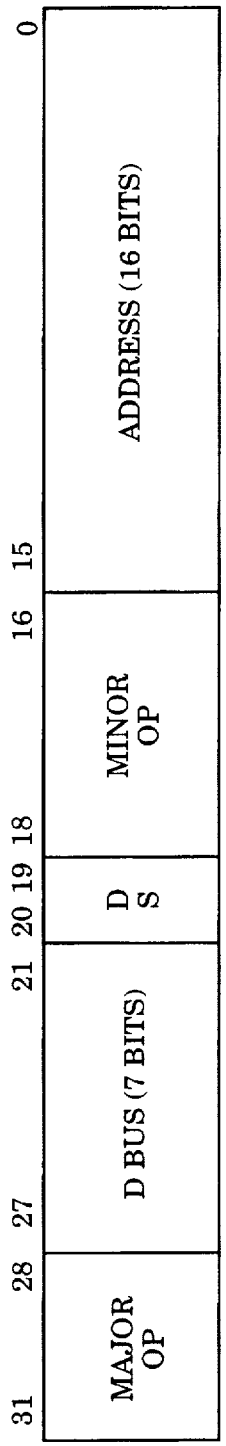
FIGS. 11a–11b illustrate the format of specialized geometry branch micro instructions implemented in the floating-point processor that provide individual tests of conditions and combinations for commonly occurring conditions.

FIGS. 11a–11b illustrate the format of specialized geometry branch micro instructions implemented in the floating-point processor 40. The specialized geometry branch micro instructions provide individual tests of conditions and combinations for commonly occurring conditions. The geometry_mode register determines whether one, two, or three vertices in the clip_bits register are used to determine the branch condition.

The conditional branch micro instructions implemented in the floating-point processor 40 test one of several specified conditions. If the specified branch condition is true, a delayed branch is initiated to an absolute 16 bit address specified within the conditional branch micro instruction. The next sequential micro instruction following the conditional branch micro instruction executes unconditionally. The flow of micro instruction execution changes at the next micro instruction, which is the micro instruction located at the absolute target of the conditional branch micro instruction.

The branch condition bits and the 16 bit destination address in a micro instruction overtake the bits used to specify the A, B, and C buses in the arithmetic micro instructions. Nevertheless, the D bus specification and the two DS source selection bits remain in the conditional branch micro instructions. Thus on the same micro instruction cycle for execution of the conditional branch micro instruction, a store from any of the four D bus sources (the FALU 206, the FMUL 200, the reciprocal circuit 202, and the IALU 204) can occur in parallel, thereby emptying the pipeline during a possible change in micro instruction flow.

The geometry branch micro instructions implemented on the floating-point processor 40 employ the intermediate conditional values for primitive trivial reject (ptr) and primitive out code (poc). The geometry_mode field of the state_bits register determines the calculation of the ptr and poc [5:0].

A 3D dot may be trivially rejected in NPC space if outside of any clip plane. Such a condition is described in terms of a boolean equation formed from bits from the clip_bits register:

geometry_mode == vector:

ptr =   (xpw1 && xpw2)   |   (xmw1 && xmw2)   |
        (ypw1 && ypw2)   |   (ymw1 && ymw2)   |
        (zpw1 && zpw2)   |   (zmw1 && zmw2)   |

A 3D vector may be trivially rejected in NPC space if both vertices are outside at least one (the same one) clip plane. Such a condition described in terms of a boolean equation formed from bits from the clip_bits register:

geometry_mode == victor:

ptr =   (xpw1 && xpw2)   |   (xmw1 && xmw2)   |
        (ypw1 && ypw2)   |   (ymw1 && ymw2)   |
        (zpw1 && zpw2)   |   (zmw1 && zmw2)   |

A 3D triangle may be trivially rejected in NPC space if all three vertices are outside at least one (the same one) clip plane. Such a condition is described in terms of a boolean equation formed from bits from the clip_bits register:

geometry_mode == triangle:

ptr =   (xpw1 && xpw2 && xpw3)   |   (xmw1 && xmw2 && xmw3)   |
        (ypw1 && ypw2 && ypw3)   |   (ymw1 && ymw2 && ymw3)   |
        (zpw1 && zpw2 && zpw3)   |   (zmw1 && zmw2 && zmw3)   |

The poc is formed by a boolean equation of bits from the clip_bits register:

geometry_mode == Dot:

poc[0]  =  xpw1
poc[1]  =  xmw1
poc[2]  =  ypw1
poc[3]  =  ymw1
poc[4]  =  zpw1
poc[5]  =  zmw1 geometry_mode == Vector:

poc[0]  =  xpw1  |  xpw2
poc[1]  =  xmw1  |  xmw2
poc[2]  =  ypw1  |  ypw2
poc[3]  =  ymw1  |  ymw2
poc[4]  =  zpw1  |  zpw2
poc[5]  =  zmw1  |  zmw2

The boolean equation for determining whether a primitive is not outside (pno) the outer clip bounds is a NOR of the six poc bits:

pno=!(poc[0]|poc[1]|poc[2]|poc[3]|poc[4]|poc[5])

The equation for determining whether a primitive is outside of more than one of the outer clip bounds, a.k.a. multi-plane clip (mpc), is a count of the six poc bits:

mpc=count(poc[i])>1

Given the intermediate values defined above and several state bits, the geometry branch conditions for the geometry branch instructions are defined below.

Branch if any portion of the primitive is outside of the positive x clip plane.

Geometry Branch Positive X gbpx=poc[0]

Branch if any portion of the primitive is outside of the negative x clip plane.

Geometry Branch Minus X gbmx=poc[1]

Branch if any portion of the primitive is outside of the positive y clip plane.

Geometry Branch Positive Y gbpy=poc[2]

Branch if any portion of the primitive is outside of the negative y clip plane.

Geometry Branch Minus Y gbmy=poc[3]

Branch if any portion of the primitive is outside of the positive z clip plane.

Geometry Branch Positive Z gbpz=poc[4]

Branch if any portion of the primitive is outside of the negative z clip plane.

Geometry Branch Minus Z gbmz=poc[5]

Branch if the primitive can be trivially rejected. A primitive can be trivially rejected if entirely outside of any clip plane.

Geometry Branch Clip Trivial Reject gbctr=ptr

Branch if the primitive cannot be trivially accepted. A primitive cannot be trivially accepted if any portion lies outside of any clip plane, or if model_clipping is enabled.

Geometry Branch Not Trivial Accept gbnta=!pno|model_clipping_enabled

Branch if the primitive must be clipped against more than one clip plane or if model clipping is enabled.

Geometry Branch Not Single Edge Clip gbnsec=mpc|model_clipping_enabled

Branch if the face of the primitive being processed is to be rejected or if the primitive can be trivially rejected. This branch checks the current face of the primitive against both the front_face_reject and back_face_reject bits in the state_bits registers. If the rejection bit for the current face is set, then the branch is taken. When a certain face (direction) of the primitive should not be seen, a command is sent to the floating-point processor 40 to set the rejection bit for that particular face (front or back reject). Thereafter, when the primitive is processed, the microcode checks the rejection bits to determine whether to reject the primitive and get another primitive, or continue processing the current primitive.

Geometry Branch Wrong Face Reject gbwfr=(reject_back_face && face_we_got)| (reject_front_face && !face_we_got)|

Branch if model clipping is enabled.

Geometry Branch Model Clipping Enabled gbmce=model_clipping_enabled

Branch if correct face material is not installed or if primitive face should be rejected or if primitive should be trivially rejected. A command is sent to the floating-point processor 40 to employ the back props. The floating-point processor 40 microcode sets the use_back_props bit in the state_bits register. Thereafter, material properties for the front and backfaces followed by some primitives are transferred to the floating-point processor 40. Thereafter, when one of the primitive faces does not match the last face that was processed, the microcode changes the material properties to process the primitive when this branch is taken. This branch is also used as another check for wrong face reject or for trivial reject.

Geometry Branch Not Correct Material Installed

```
gbncmi  =  (use_back_props &&
            (mat_face_installed !=face_we_got))      |
            (reject_back_face && face_we_got)        |
            (reject_front_face && !face_we_got)      | ptr
```

Branch if back face material is installed. This branch is used after the floating-point processor 40 microcode has installed the back face materials on the previous primitive or in the initialization of the primitive, and the use_back_props bit has been set in the state_bits register. This branch is used to decide whether the normals are negated when transformed.

Geometry Branch Back Face Installed gbbfi=use_back_props && mat_face_installed

Branch if using back properties and back face. This branch is taken when back face materials are to be used for the lighting calculations. The floating-point processor 40 microcode installs the back face materials needed for calculating the lights that are applied to the primitive.

Geometry Branch Use Back Face gbubf=face_we_got && use_back_props

Branch if back face. This branch is used to determine transformation of the normals. If the incoming primitive has front facing normals, the normals are transformed. If the incoming primitive has back facing normals, the normals need to be transformed and inverted before applying the lighting model to the primitive.

Geometry Branch Back Face gbbf=face_we_got

Branch if the clip-pending bit in the state_bits register is set.

Geometry Branch Clip_pending Set gbcps=clip_pending

FIG. 12a illustrates the state bits register which contains assortment of special condition bits. The two bit geometry_mode field determines use of the clip_bits register to calculate geometry branch conditions. The two bit geometry_mode field also affects loading of the swap_rr bits. The two geometry_mode bits specify either dots, vectors, or triangles. The clip_mode bit determines whether clip_test instruction clips to one or two planes.

Model clipping may be included in the clip pipe. To allow common code to be used for fast execution when model clipping is not enabled, a special conditional bit, model_clipping_enabled is included in the state bits register. The state of model_clipping_enabled is tested by a special branch instruction.

The state bits register provides two "face rejection bits" (reject back faces and reject front faces) to specify three possible modes of "face rejectance": reject back, reject front, and reject none. These bits are set by a modify state bits micro instruction. The default setting of the bits to zero allows both front and back faces to be accepted. Setting just one or the other allows back or front face rejection.

The face_we_got bit of the state bits register indicates dynamically the current face. A setting of 0 indicates the front face, a setting of 1 indicates the back face. The face_we_got bit is set by the modify state bits micro instruction.

The state bits described above enables trivial clip rejection and wrong face rejection control flow branching to take place with one special branch instruction. The special branch instruction determines the conditions from the 30 clip bits, two face rejectance bits, and one face_we_got bit.

Some geometry formats allow the two sides of a surface to have different surface properties and degrees of lighting, and both sides to share the same properties. Typically, a triangle strip has a sequence of triangles facing the same direction, and then turn over to show the other side. Two bits in the state bits register enable properties and lighting assumptions to be cached. The use_back_props bit if 0 indicates use the cached values which are for the front face. When use_back_props is 1, the mat_face_installed indicates the side of the material currently installed (0 for front, 1 for back).

The output_len and output_dst fields of the state bits register specifies a length and a destination for transfer of the draw packet from the O registers by the output circuit 145. The output_len field indicates the length of the draw packet. The output_dst bit specifies either the draw processors 50 54 or the command preprocessor 30 as the destination of the draw packet.

The swap fields of the state bits register bits enable remapping, or swapping, of bus indices to R registers. The swaps apply to R registers R8 through R31. The swaps operate on three eight register groups. The R registers R8 through R15 are group 1, The R registers R16 through R23 are group 2, and the R registers R25 through R31 are group 3.

The swaps are specialized for geometric sorts. For the case of triangles, the three vertices are stored in the three register groups 1–3. The swap operation sorts the y component of vertex to achieve $y1 \leq y2 \leq y3$.

To begin the swap operation, three floating point compare micro instructions are consecutively executed, followed by a modify control and mode bits micro instruction to load the three previous greater-than results into swap_rr ($0 \geq$ false, $1 \geq$ true). When the geometry_mode is vector, the (y1>y3) and (y2>y3) comparisons are forced to zero when the swap_rr field is loaded as a result of the FALU 206 comparisons. The swap_rr field can also be loaded from immediate data in the modify control and mode bits micro instruction.

FIG. 12b illustrates the vertex compare sort results stored in the swap rr field of the state bits register for all possible y coordinate orderings. FIG. 12c illustrates the remapping of the group 1–3 R registers corresponding to the contents of the swap_rr field. The re-mapping remains in effect until another modify control and mode bits micro instruction zeros the swap rr field, or until another modify control and mode bits micro instruction is executed to load condition bits. While the swapping is in effect, all references to R registers R8 through R31 are subject to the register reordering.

Figures 13A, 13B, 13C:
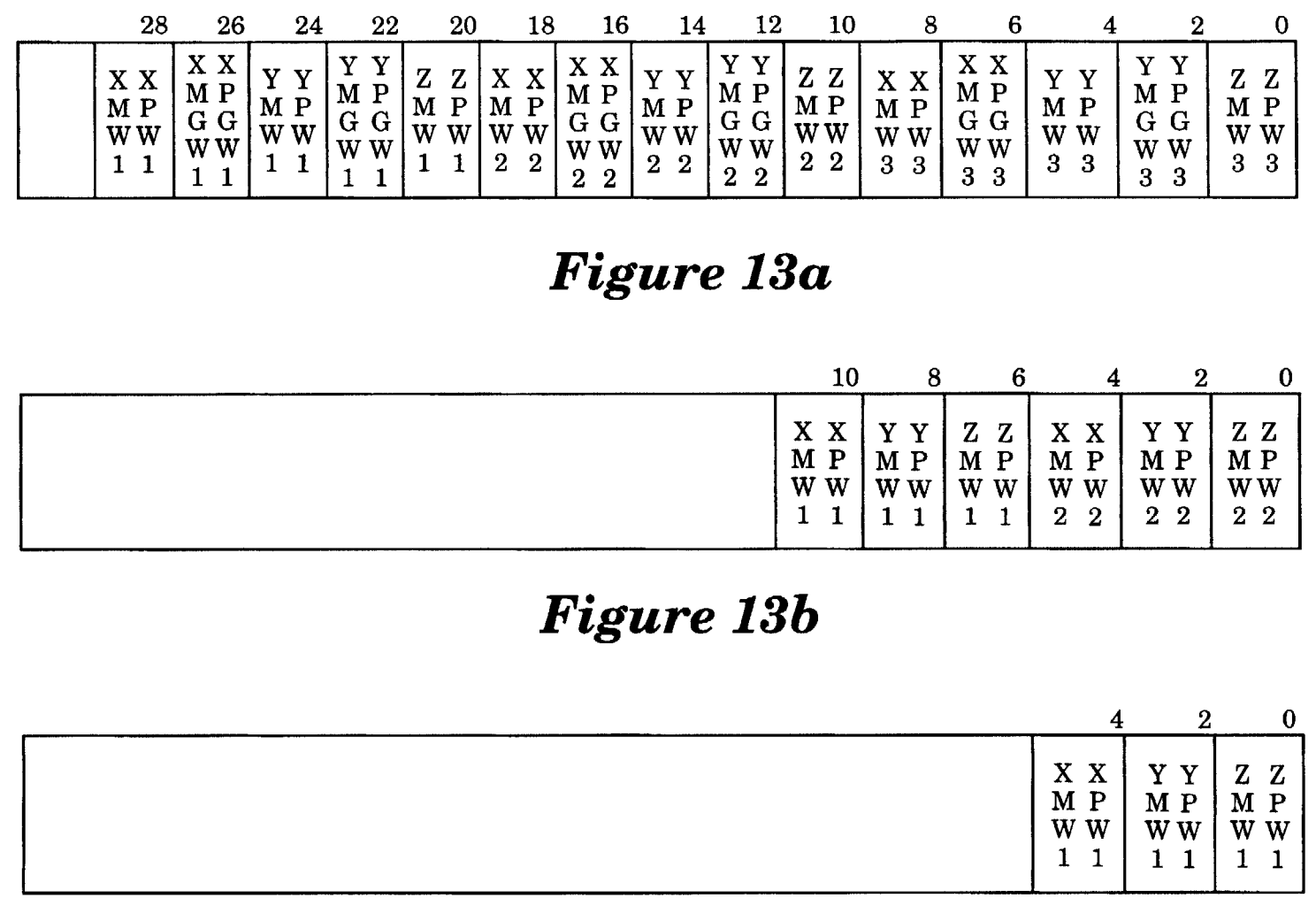

The clip bits register is organized differently for triangles, vectors, and dots. FIG. 13a illustrates the organization of the clip bits register for triangles. Each pair of bits in the clip bits register correspond to in/out bits for a particular vertex compared against an opposed pair of clipping planes. For example, in the two bits "XPW1" and "XMW1", the first ("plus") bit is one only if the X coordinate of vertex 1 is to the right of the inner X clip plane, the second ("minus") bit is one only if the X coordinate is to the left of the inner X left clip plane. The next two bits "XPGW1" and "XMGW1" are similar, except that the tests were against the outer X "guard" clip planes. The remainder of the bits are similar. Since guard testing does not apply to Z coordinates, the Z clip test bits have no guard tests.

FIG. 13b illustrates the organization of the clip bits register for vectors. FIG. 13c illustrates the organization of the clip bits register for dots.

Bits in the clip bits register are set by execution of the clip_test micro instruction. Each clip_test micro instruction generates either another bit or pair of bits, which are shifted into the clip_bits register.

Figure 13D:
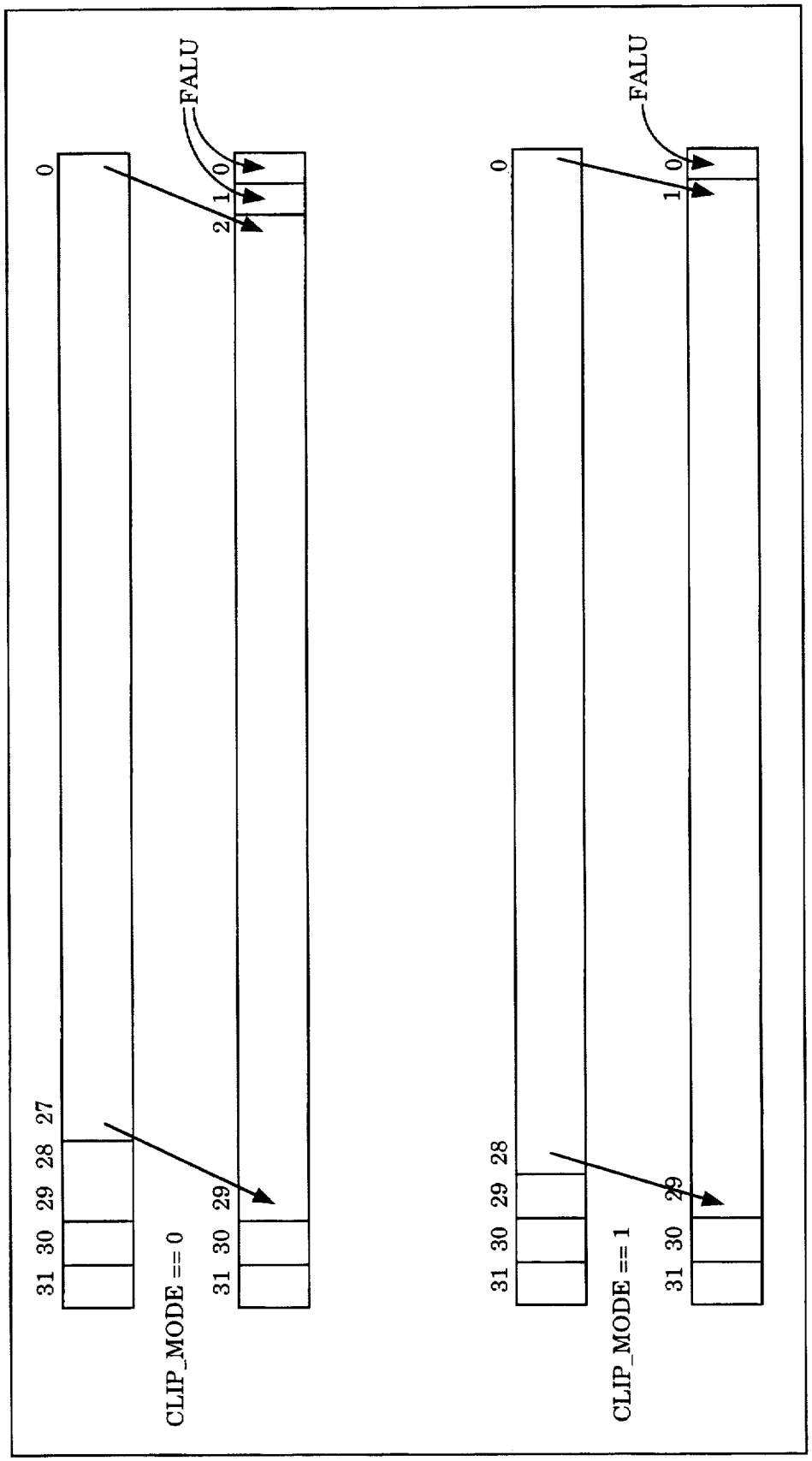

FIG. 13d illustrates the motion of a shift operation that occurs when the clip_test instruction is executed. The new bits coming in on the top right are the results of clip testing, and the arrows show the motion of bits.

FIGS. 14–14b illustrate the modify state bits micro instruction, which updates selected bits in state_bits register of the floating-point processor 40. Separate enable bits are provided for each of the state_bits addressed by the modify state bits micro instruction. Bits 1 and 0 select one of four sources for the D bus as follows: select source with the DS field, pop the PC stack, clip_bits register source, or the state_bits register source.

The face_we_got bit of the state bits register is loaded from the fcc conditions from the FALU 206. A 0 indicates front face and a 1 indicates back face. If the fcc condition is 1 ([A bus] or [m out]<[C bus]) then face_we_got is set to 1. Any other fcc condition sets face_we_got to 0.

FIGS. 15–15b illustrate the load miscellaneous registers micro instruction, which loads the non register file registers from dynamic results. The registers targeted include the clip_bits register, the state_bits register, and the PC (program counter). In addition, output_len field, the dispatch mask, the geometry mode, and the clip_registers may be loaded with the load miscellaneous registers micro instruction. The geometry mode selects one of the following clipping modes: 1=dots, 2=lines, or 3=triangles.

Figures 16A, 16B:
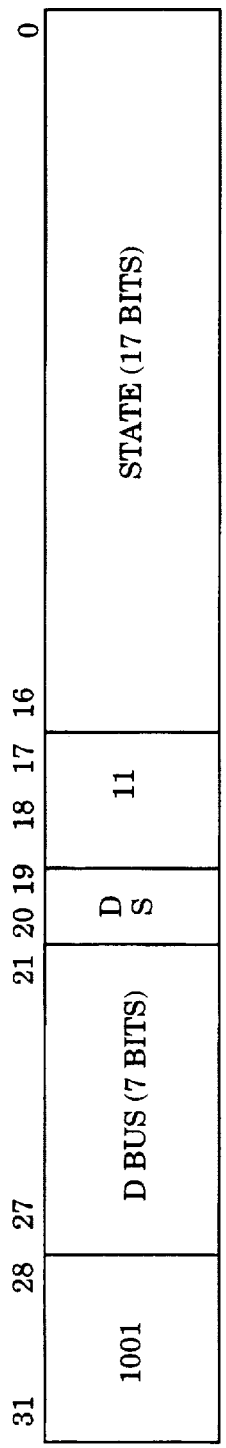

FIGS. 16–16b illustrate the modify control and mode bits micro instruction, which updates selected bits in the state_bits register, and causes certain control actions to be initiated. Separate enable bits are provided for the state_bits addressed by the modify control and mode bits micro instruction.

When the "dispatch off new I (if not clip pending)" bit is set within the modify control and mode bits micro instruction, the flow of micro instruction execution does not continue in line, unless the clip_pending bit is true. Instead, the following sequence of events occur. If the free_O bit is set, a signal is sent to the output circuit 145 indicating that an draw packet is complete in the O register file. Thereafter, the output circuit 145 broadcasts the draw packet to the draw processors 50–54. If an I bank of the input circuit 141 is not allocated, the need_I should be set. The control sequencer stalls until a new input buffer is available. When a new I bank is available, the lower five, seven, or nine bits of I register I0 are taken as the message name of the new input, and are formed into an absolute address into the CS 49. The instruction at the absolute address is fetched, decoded, and dispatched. Thereafter, normal instruction processing resumes starting with the first instruction of the appropriate message subroutine.

If the current reformatted vertex packet does not generate an draw packet, the "null output" bit is set rather than the "free_O" bit described above. The current reformatted vertex packet may not generate an draw packet because all of the geometry was clipped away, or due to back facing, etc.

In the foregoing specification the invention has been described with reference to specific exemplary embodiments thereof it will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. A method for performing floating-point processing functions for a graphics accelerator, comprising the steps of:

receiving a reformatted geometry packet over a command to floating-point bus from a command preprocessor, and buffering the reformatted geometry packet in a multiple buffer input register file;

generating an draw packet by reading a plurality of specialized graphics micro instructions from a control store and executing the specialized graphics micro instructions using a set of function units and a general purpose register file having a first register group, a second register group and a third register group, the specialized graphics micro instructions comprising a floating-point compare micro instruction and a swap micro instruction, the swap micro instruction rearranging a register map for the general purpose register file according to a series of result flags corresponding to the floating-point compare micro instruction, such that a set of vertex values stored in the first, second, and third register groups are sorted in a predefined order;

broadcasting the draw packet over a command to draw bus to a plurality of draw processors.

2. The method of claim 1, wherein the function units comprise a floating-point multiplier circuit, a floating point arithmetic logic unit circuit, a reciprocal circuit, a reciprocal square-root circuit, and an integer arithmetic logic unit circuit.

3. The method of claim 1, wherein the general purpose register file comprises a predetermined number of general purpose registers, such that the predetermined number of general purpose registers provides data storage for three dimensional graphics processing algorithms.

4. The method of claim 1, wherein the specialized graphics micro instructions further comprise a clip test micro instruction, the clip test micro instruction comparing a point to one or two clip planes according to a clip-mode bit of a state-bits register, and shifting one or two result bits into a clip bits register.

5. The method of claim 4, wherein the specialized graphics micro instructions further comprise a plurality of geometry conditional branch instructions, each geometry conditional branch instruction determining a branch condition according to the clip bits register.

6. The method of claim 5, wherein the specialized graphics micro instructions further comprise a micro instruction for converting a floating-point value to an integer value, a micro instruction for converting the integer value to the floating-point value, and a micro instruction for determining an absolute value of a data value.

7. The method of claim 6, wherein the specialized graphics micro instructions further comprise a floating-point reciprocal micro instruction.

8. The method of claim 7, wherein the specialized graphics micro instructions further comprise a block load instruction and a block store instruction for performing data block transfers between the control store and the general purpose register file.

9. A floating-point processor for a graphics accelerator comprising:
   a general purpose register file having a plurality of register groups optimized to provide data storage for commonly occurring three dimensional graphics processing algorithms; and
   circuitry providing a plurality of specialized graphics micro instructions including a set of micro instructions for sorting a set of triangle vertex values in preparation for scan conversion in the graphics accelerator, said circuitry includes a control store to store said plurality of specialized graphics micro instructions, and a set of function units to execute said plurality of specialized graphics micro instructions in order to produce a draw packet.

10. The floating-point processor of claim 9, wherein said set of micro instructions for sorting a set of triangle vertex values comprises a floating-point compare micro instruction and a swap micro instruction, wherein said swap micro instruction rearranges a register map for a first, a second, and a third register group of said general purpose register file according to a series of result flags corresponding to said floating-point compare micro instruction, such that said triangle vertex values stored in said first, said second, and said third register groups are sorted in a predefined order.

11. The floating-point processor of claim 9, further comprising a multiple buffer input register file that buffers a reformatted geometry packet received over a command to floating-point bus wherein said reformatted geometry packet specifies said triangle vertex values.

12. The floating-point processor of claim 9, further comprising a multiple buffer output register file such that the floating-point processor assembles said draw packet into said output register file and transfers said draw packet over a command to draw bus to render a geometry object specified by said draw packet.

13. The floating-point processor of claim 9, further comprising a set of functional units for executing said plurality of specialized graphics micro instructions including a floating-point multiplier, a floating point arithmetic logic unit, a reciprocal circuit, a reciprocal square-root circuit, and an integer arithmetic logic unit.

14. The floating-point processor of claim 9, wherein said plurality of specialized graphics micro instructions further comprises a clip test micro instruction for comparing a point to one or two clip planes according to a clip-mode bit of a state-bits register, and for shifting one or two result bits into a clip bits register.

15. The floating-point processor of claim 14, wherein said plurality of specialized graphics micro instructions further comprises a plurality of geometry conditional branch instructions each for determining a branch condition according to said clip bits register.

16. The floating-point processor of claim 9, wherein said plurality of specialized graphics micro instructions further comprises a micro instruction for converting a floating-point value to an integer value, a micro instruction for converting said integer value to said floating-point value, and a micro instruction for determining an absolute value of a data value.

17. The floating-point processor of claim 9, wherein said plurality of specialized graphics micro instructions further comprises a micro instruction for determining a floating-point reciprocal of data value.

18. The floating-point processor of claim 9, wherein said plurality of specialized graphics micro instructions further comprises a block load instruction and a block store instruction each for performing data block transfers between a control store for the floating-point processor and said general purpose register file.

19. A floating-point processor for a graphics accelerator, comprising:
   an input circuit having a multiple buffer input register file, said input circuit receiving a reformatted geometry packet and buffering said reformatted geometry packet;
   a register file circuit having a general purpose register file to store information used to assemble a draw packet, said register file circuit coupled to said input circuit;
   a control sequencer coupled to said input circuit and said register file circuit to assemble said draw packet by reading a plurality of specialized graphics micro instructions from a control store and executing said plurality of specialized graphics micro instructions using a set of function units; and
   an output circuit having a multiple buffer output register file to receive said draw packet from said control sequencer, buffer said draw packet, and output said draw packet, said output circuit coupled to said input circuit, said register file circuit, and said control sequencer.

20. The floating-point processor of claim 19, wherein said plurality of specialized graphics micro instructions include a floating-point compare micro instruction and a swap micro instruction, said swap micro instruction rearranges a register map for a first register group, a second register group, and a third register group according to a series of result flags corresponding to said floating-point compare micro instruction, such that a set of vertex values stored in said first, second, and third register groups are sorted in a predefined order.

21. The floating-point processor of claim 19, wherein said set of function units includes a floating-point multiplier circuit, a floating point arithmetic logic unit circuit, a reciprocal circuit, a reciprocal square-root circuit, and an integer arithmetic logic unit circuit.

22. The floating-point processor of claim 19, wherein said general purpose register file includes a predetermined number of general purpose registers, such that said predetermined number of general purpose registers provides storage for three dimensional graphics processing algorithms.

23. The floating-point processor of claim 19, wherein said plurality of specialized graphics micro instructions further includes a clip test micro instruction, said clip test micro instruction compares a point to one or two clip planes according to a clip-mode bit of a state-bits register, and shifts one or two result bits into a clip bits register.

24. The floating-point processor of claim 23, wherein said plurality of specialized graphics micro instructions further includes a plurality of geometry conditional branch instructions, each of said plurality of geometry conditional branch instructions determines a branch condition according to the clip bits register.

25. The floating-point processor of claim 24, wherein said plurality of specialized graphics micro instructions further includes a micro instruction for converting a floating-point value to an integer value, a micro instruction for converting said integer value to said floating-point value, and a micro instruction for determining an absolute value of a data value.

26. The floating-point processor of claim 25, wherein said plurality of specialized graphics micro instructions further includes a floating-point reciprocal micro instruction.

27. The floating-point processor of claim 26, wherein said plurality of specialized graphics micro instructions further includes a block load instruction and a block store instruction for performing data block transfers between said control store and said general purpose register file.

* * * * *

UNITED STATES PATENT AND TRADEMARK OFFICE
CERTIFICATE OF CORRECTION

PATENT NO. : 5,517,611
DATED : May 14, 1996
INVENTOR(S) : Michael F. Deering

It is certified that error appears in the above-indentified patent and that said Letters Patent is hereby corrected as shown below:

Title page item [56], delete " 359/163 " and insert -- 395/163 --.

Title page item [73], delete " microsystems " and insert -- Microsystems --.

In column 9 at line 20 after the word through, please insert -- P63. --.

In column 10 at line 4, please delete " clip_is " and insert -- clip_mode is --.

In column 10 at line 32, please delete " the. " and insert -- the --.

In column 11 at line 24, please delete

" geometry_mode==vector:

ptr =    (xpw1 && xpw2) | (xmw1 && xmw2) |

(ypw1 && ypw2) | (ymw1 && ymw2) |

(zpw1 && zpw2) | (zmw1 && zmw2) | "

and insert

-- geometry_mode==dot:

ptr =    xpw1 | xmw | ypw1 | ymw1 | zpw1 | zmw1    --.

UNITED STATES PATENT AND TRADEMARK OFFICE
CERTIFICATE OF CORRECTION

PATENT NO. : 5,517,611
DATED : May 14, 1996
INVENTOR(S) : Michael F. Deering

It is certified that error appears in the above-indentified patent and that said Letters Patent is hereby corrected as shown below:

In column 11 at line 35, please delete " victor " and insert -- vector --.

In column 12 at line 5, please delete " ypw2 " and insert -- ypw3 --.

In column 12 after line poc[5] = zmw1 | zmw2, please insert

-- geometry-mode = Triangle:

| | | | | | | |
|---|---|---|---|---|---|---|
| poc [0] | = | xpgw1 | \| | xpgw2 | \| | xpgw3 |
| poc [1] | = | xmgw1 | \| | xmgw2 | \| | xmgw3 |
| poc [2] | = | ypgw1 | \| | ypgw2 | \| | ypgw3 |
| poc [3] | = | ymgw1 | \| | ymgw2 | \| | ymgw3 |
| poc [4] | = | zpw1 | \| | zpw2 | \| | zpw3 |
| poc [5] | = | zmw1 | \| | zmw2 | \| | zmw3 --. |

UNITED STATES PATENT AND TRADEMARK OFFICE
CERTIFICATE OF CORRECTION

PATENT NO. : 5,517,611
DATED : May 14, 1996
INVENTOR(S) : Michael F. Deering

It is certified that error appears in the above-indentified patent and that said Letters Patent is hereby corrected as shown below:

In column 15 at line 58, please delete "clip_registers" and insert -- clip_mode registers --.

Signed and Sealed this

Tenth Day of December, 1996

Attest:

BRUCE LEHMAN

Attesting Officer

Commissioner of Patents and Trademarks